United States Patent [19]

Jones

[11] 4,152,975
[45] May 8, 1979

[54] POTATO CHIP APPARATUS

[76] Inventor: John R. Jones, 3676 Old Street Ct., Memphis, Tenn. 38118

[21] Appl. No.: 739,309

[22] Filed: Nov. 5, 1976

[51] Int. Cl.² .............................................. A47J 37/12
[52] U.S. Cl. ........................................ 99/352; 99/404; 99/427
[58] Field of Search .......................... 99/404, 325–326, 99/327–328, 329, 334–335, 336, 352–353, 355, 362, 405–406, 407, 427, 443, 468, 474, 477, 347, 403, 360–361, 367–370; 68/19.1; 198/626, 841; 426/438–439, 457, 465, 496, 497

[56] References Cited

U.S. PATENT DOCUMENTS

| | | | |
|---|---|---|---|
| 1,570,235 | 1/1926 | Fooks | 99/362 |
| 1,919,185 | 7/1933 | Chapman | 99/404 |
| 2,512,591 | 6/1950 | Alexander | 99/404 X |
| 2,783,154 | 2/1957 | Rivoche | 426/438 X |
| 2,948,619 | 8/1960 | Ashley | 99/347 X |
| 3,132,949 | 5/1964 | Crowe | 99/404 X |
| 3,256,803 | 6/1966 | Nelson | 99/443 C X |
| 3,276,352 | 10/1966 | Allen et al. | 99/353 X |
| 3,280,723 | 10/1966 | Hughes et al. | 99/353 |
| 3,282,197 | 11/1966 | Smith, Jr. | 99/405 |
| 3,331,375 | 7/1967 | Hickey et al. | 99/404 X |
| 3,364,845 | 1/1968 | Wilson et al. | 99/336 |
| 3,365,301 | 1/1968 | Lipoma et al. | 99/353 X |
| 3,448,677 | 6/1969 | Dexters | 99/336 |
| 3,608,474 | 9/1971 | Liepa | 99/353 |
| 3,763,764 | 10/1973 | Schy | 99/353 |
| 3,800,565 | 4/1974 | Worth et al. | 68/19.1 X |

FOREIGN PATENT DOCUMENTS 1034035  6/1966  United Kingdom ...................... 99/404

Primary Examiner—Harvey C. Hornsby
Assistant Examiner—Arthur O. Henderson

[57] ABSTRACT

Apparatus for preparing cooked potato chips from raw potatoes. The apparatus includes a slicer for cutting thin potato slices from a raw potato, a conveyor for receiving the thin potato slices as they are cut by the slicer and for conveying the thin potato slices along a sinuous path, a reservoir for containing a quantity of cooking oil, and a heater for heating the quantity of cooking oil. The thin potato slices being conveyed along the sinuous path by the conveyor are suffused with the heated cooking oil whereby the thin potato slices are cooked. The thin potato slices may be suffused with the heated cooking oil by being conveyed through the heated cooking oil contained within the reservoir or by passing through a mist of the heated cooking oil.

9 Claims, 14 Drawing Figures

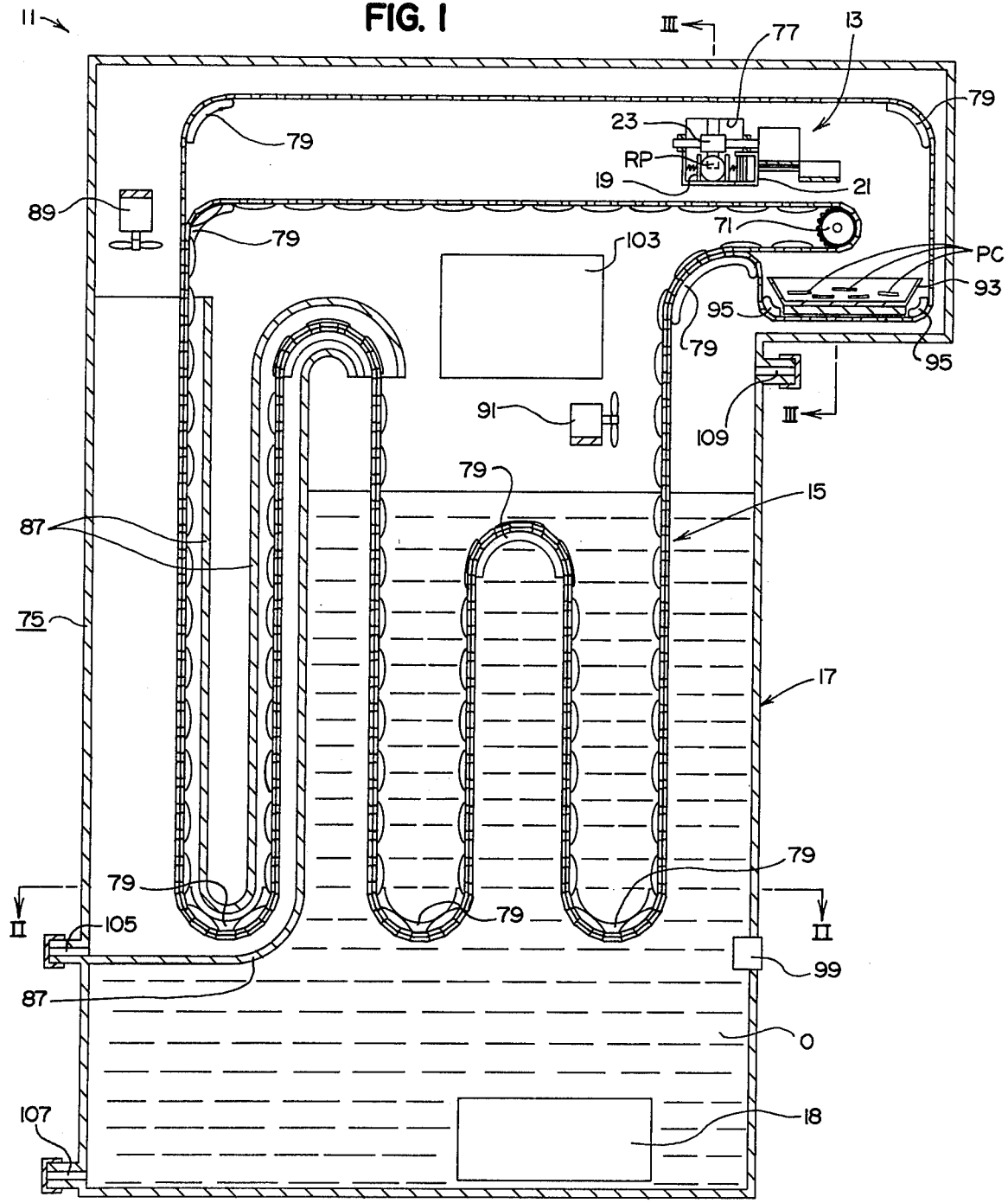
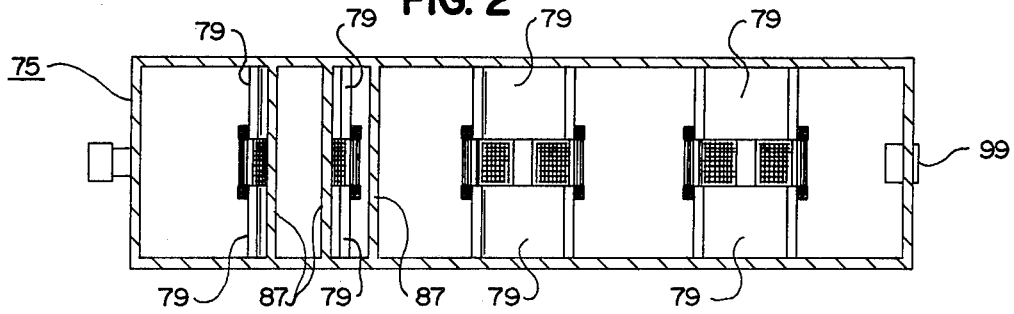

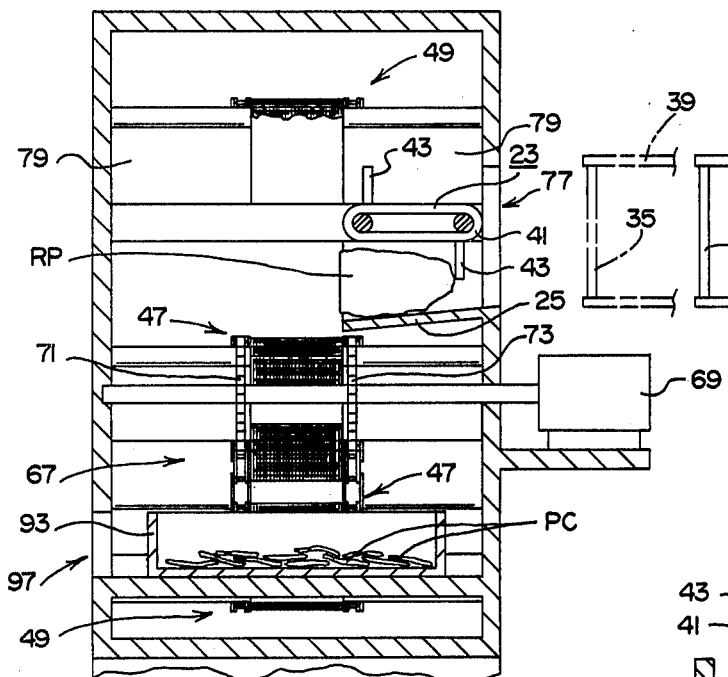
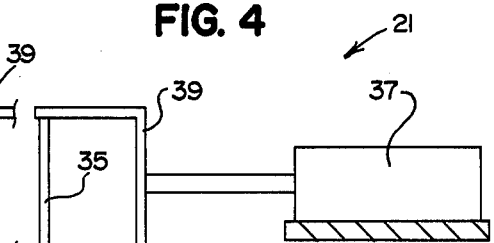
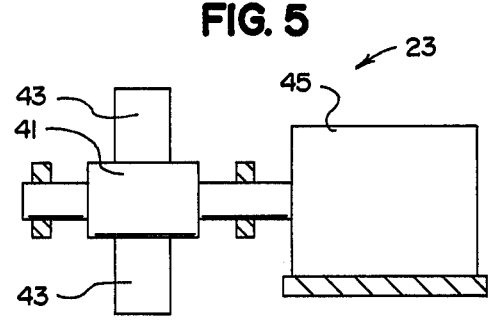
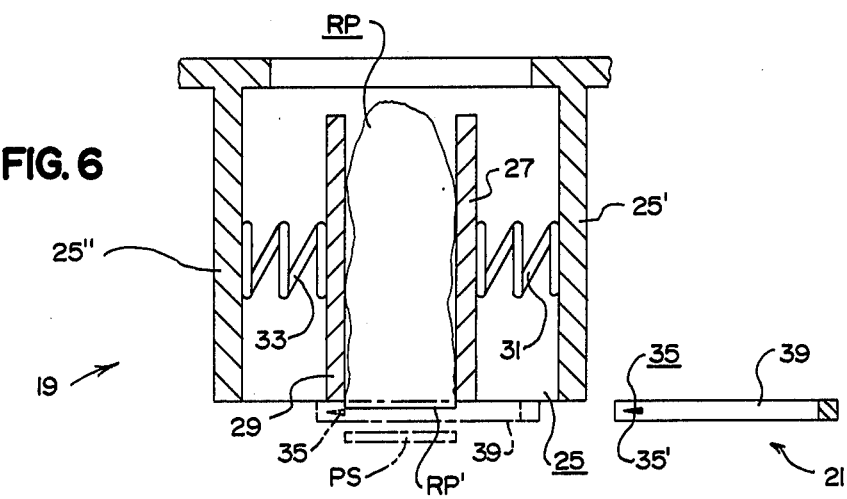
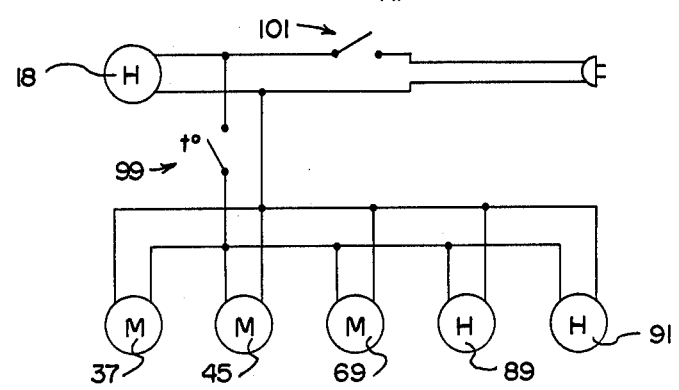

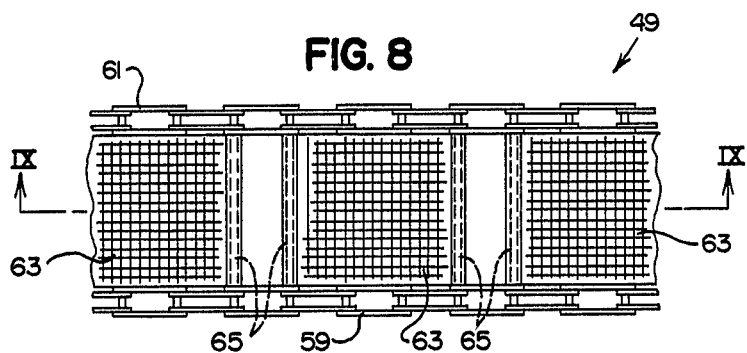
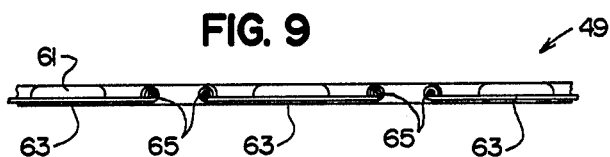
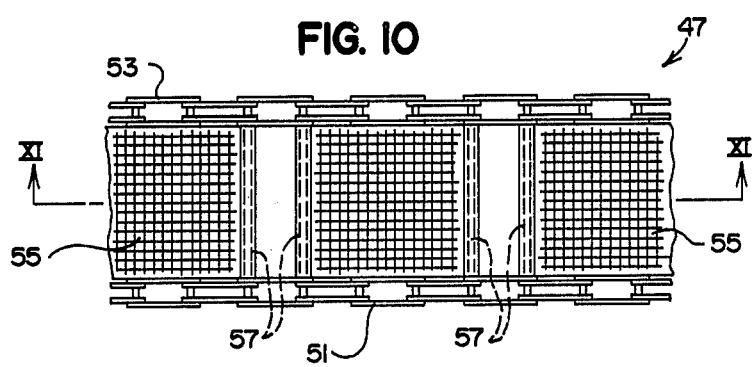
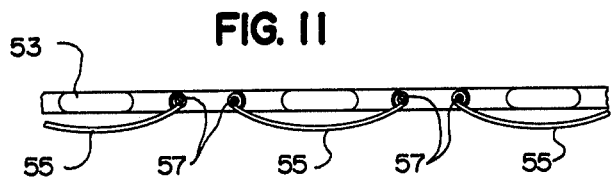
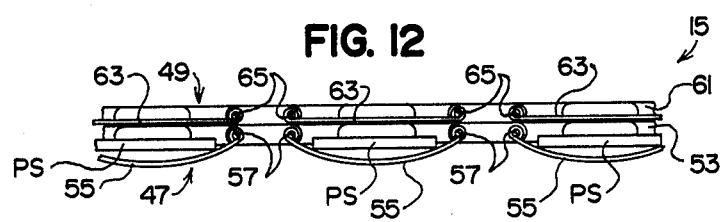

POTATO CHIP APPARATUS

BACKGROUND OF THE INVENTION

1. Field of the Invention

This invention relates to devices for processing potato chips from raw potatoes.

2. Description of the Prior Art

Heretofore, various devices have been developed for processing potato chips and the like. See, for example, Peck, U.S. Pat. No. 2,853,937; MacKendrick, U.S. Pat. No. 3,520,248; Lecrone, U.S. Pat. No. 3,573,861; Bolton et al, U.S. Pat. No. 3,708,311; Campbell et al, U.S. Pat. No. 3,905,285; and Baird, U.S. Pat. No. 3,911,805. None of the above patents disclose or suggest the present invention.

The usual method of processing potato chips involves the manual slicing of raw potatoes, the insertion of these slices into a reservoir of hot cooking oil for a predetermined period so that the slices are fried to a crisp state, and then the removal of the fried chips from the reservoir of cooking oil. MacKendrick, Campbell et al, and Baird disclose machines for continuously cutting sections of a predetermined shape from a dough sheet and frying those sections to provide a crisp, chip type product. The MacKendrick, Campbell et al, and Baird machines are not entirely satisfactory for use by an average individual housewife in a noncommercial operation since the machines' construction is relatively complicated and expensive and since they require critical additional steps such as making dough sheets and the like.

SUMMARY OF THE INVENTION

The present invention is directed towards providing the average housewife with an inexpensive, relatively simple device capable of processing potato chips from raw potatoes. The concept of the present invention is to provide an apparatus which cuts thin potato slices from a raw potato and which then cooks those slices into potato chips.

The apparatus of the present invention includes, in general, a slicer means for cutting thin potato slices from a raw potato, conveyor means for receiving the thin potato slices as they are cut by the slicer means and for conveying the thin potato slices along a sinuous path, reservoir means for containing a quantity of cooking oil, heater means for heating the quantity of cooking oil, and means for causing the thin potato slices being conveyed by the conveyor means to be suffused with the heated cooking oil whereby the thin potato slices are cooked.

BRIEF DESCRIPTION OF THE DRAWINGS

FIG. 1 is a sectional elevational view of the apparatus of the present invention showing a first embodiment of the means for causing the potato slices to be suffused with oil.

FIG. 2 is a sectional view thereof as taken on line II—II of FIG. 1.

FIG. 3 is a sectional view thereof as taken on line III—III of FIG. 1.

FIG. 4 is an elevational view of a knife-like means of the slicer means of the present invention showing a moved position of a knife blade thereof in broken lines.

FIG. 5 is an elevational view of a drive means of the slicer means of the present invention.

FIG. 6 is a sectional view of a holding means of the slicer means of the present invention.

FIG. 7 is a schematic which digrammatically depicts the operating structure of the present invention as shown in FIG. 1.

FIG. 8 is a top plan view of a second portion of the conveyor means of the present invention.

FIG. 9 is a sectional view of the second portion of the conveyor means of the present invention as taken on line IX—IX of FIG. 8.

FIG. 10 is a top plan view of a first portion of the conveyor means of the present invention.

FIG. 11 is a sectional view of the first portion of the conveyor means of the present invention as taken on line XI—XI of FIG. 10.

FIG. 12 is a sectional view of the first and second portions of the conveyor means of the present invention.

DESCRIPTION OF THE PREFERRED EMBODIMENT

Figure 13:
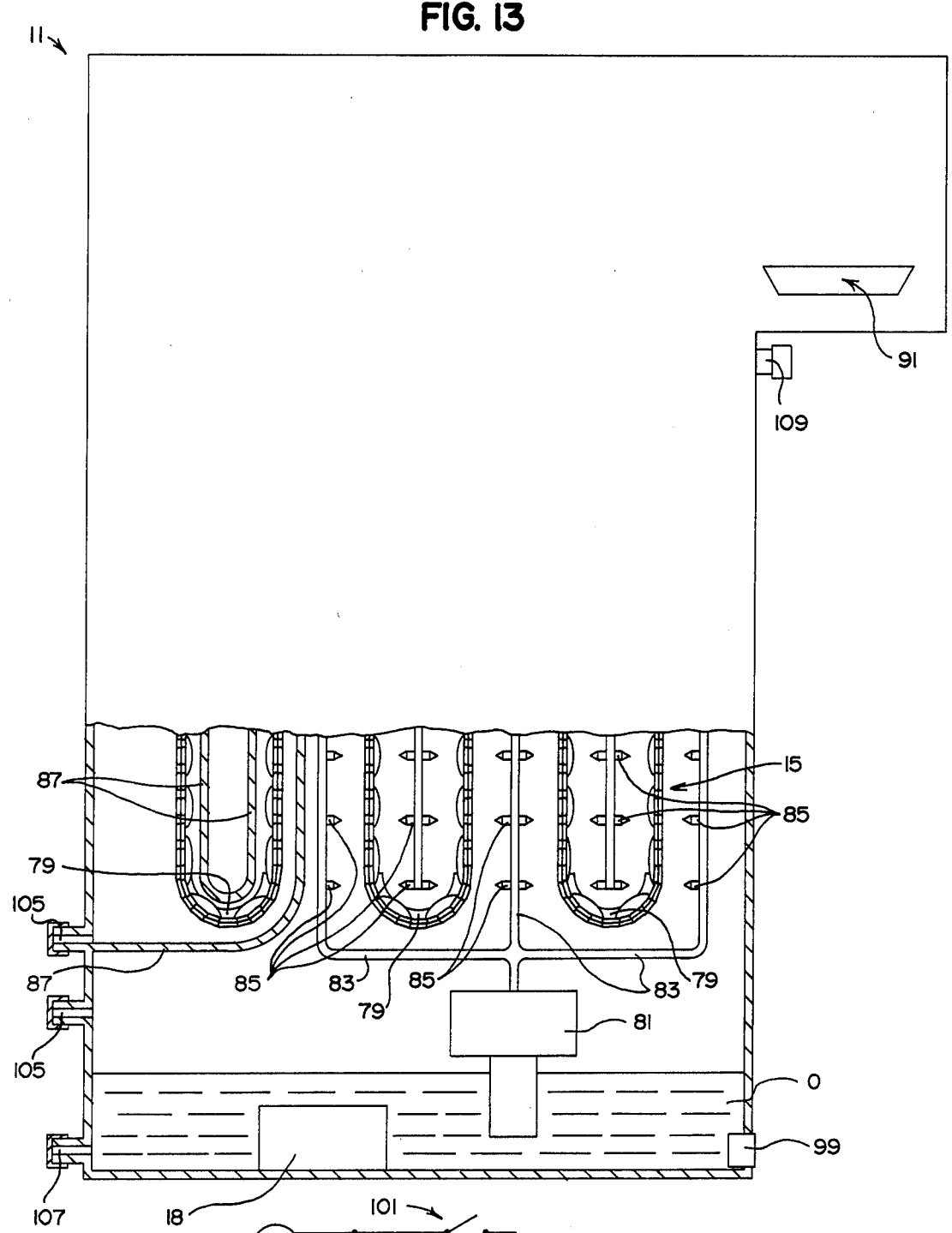
FIG. 13 is a partially sectional elevational view of the apparatus of the present invention showing a second embodiment of the means for causing the potato slices to be suffused with oil.

The apparatus 11 of the present invention is for processing potato chips PC (see FIGS. 1 and 3) from raw potatoes RP (see FIGS. 1, 3 and 6). In general, the apparatus 11 of the present invention includes a slicer means 13 for cutting thin potato slices PS from the raw potato RP, conveyor means 15 for receiving the thin potato slices PS as they are cut by the slicer means 13 and for conveying the thin potato slices PS along a sinuous path, reservoir means 17 for containing a quantity of cooking oil O, heater means 18 for heating the quantity of cooking oil O, and means for causing the thin potato slices PS being conveyed by the conveyor means 15 to be suffused with the heated cooking oil O whereby the thin potato slices PS are cooked into potato chips PC.

The slicer means 13 includes a holding means 19 for holding the raw potato RP, a knifelike means 21 for cutting the thin potato slices PS from one end RP' (see FIG. 6) of the raw potato RP as the raw potato RP is held by the holding means 19, drive means 23 for causing the one end RP' of the raw potato RP to advance relative to the holding means 19 as the knifelike means 21 cuts the thin potato slices PS therefrom. The holding means 19 may include a platform member 25 for supporting the raw potato RP, a pair of movable side members 27, 29 and a pair of spring members 31, 33 for coacting with the side members 27, 29 to force the side members 27, 29 against the sides of the raw potato RP as the raw potato RP is supported on the platform means 25 to frictionally hold the raw potato RP on the platform means 25. The platform member 25 may include upturned edge portions 25', 25" for trapping the spring members 31, 33 between the upturned side edges 25', 25" of the platform member 25 and the side members 27, 29. As thus constructed, it should be apparent that the holding means 19 is capable of holding substantially any size raw potato RP. It should be noted that the platform member 25 may be downwardly directed (see FIG. 3 for reasons which will hereinafter become apparent.

The knifelike means 21 of the slicer means 13 may include a substantially thin knife blade 35 (see FIGS. 4 and 6) for slicing through the raw potato RP. The knife blade 35 is adapted to move back and forth in a reciprocating manner between the position shown in solid lines in FIG. 4 and the position shown in broken lines in FIG. 4. More specifically, the knife blade 35 is preferably attached to an electrical motor 37 or the like by a frame member 39 or the like in a manner so as to cause the knife blade 35 to reciprocate back and forth to slice the raw potato RP held in the holding means 19. The knife blade 35 preferably includes at least one side 35' thereof (see FIG. 6) that is coated with a substantially frictionless material such as the material known to those skilled in the art by the trademark "Teflon" for preventing the thin potato slice PS cut from the raw potato RP therewith from sticking to the knife blade 35. The "Teflon" coated side 35' of the knife blade 35 may be slightly roughened so as to aid in preventing the thin potato slices PS from sticking to the knife blade 35.

The drive means 23 of the slicer means 13 may include an endless belt member 41 which has one or more prong-like portions 43 provided thereon for engaging the raw potato RP held by the holding means 19 to cause the raw potato RP to advance relative to the holding means 19 as the knifelike means 21 cuts the thin potato slices PS from the end RP' of the raw potato RP. The endless belt member 41 is driven by any means well known to those skilled in the art such as an electric motor 45.

The conveyor means 15 may include a first portion 47 for receiving the thin potato slices PS and a second portion 49 for covering the first portion 47 after the thin potato slices PS have been received thereon to trap the thin potato slices PS therebetween. The first and second portions 47, 49 of the conveyor means 15 are substantially open for allowing the thin potato slices PS to be suffused with the heated cooking oil O while trapped therebetween. More specifically, the first portion 47 of the conveyor means 15 may include first and second side members 51,53 and a plurality of pocket-like members 55 positioned between and attached to the first and second side members 51, 53 (see, in general FIGS. 10 and 11). The first and second side members 51, 53 may each consist of an endless length of drive chain such as that commonly used in the drive mechanisms of bicycles, motorcycles and the like and which allows the first portion 47 of the conveyor means 15 to be easily bent to follow a sinuous path. The pocket-like members 55 are constructed on an opened, screen-like material (e.g., wire mesh) and may be attached to the first and second side members 51, 53 in any manner well known to those skilled in the art such as by being attached to rod members 57 which extend between the first and second side members 51, 53. The second portion 49 of the conveyor means 15 may include first and second side member 59, 61 and a plurality of cover members 63 positioned between and attached to the first and second side members 59, 61 (see, in general, FIGS. 8 and 9). The first and second side members 59, 61 may each consist of an endless length of flexible material such as chain for allowing the second portion 49 of the conveyor means 15 to be easily bent to follow a sinuous path. The cover members 63 are constructed of an open, screen-like material (e.g., wire mesh). The cover members 63 may be attached to the first and second side members 59, 61 in any manner well known to those skilled in the art such as being attached to rod members 65 that extend between the first and second side members 59, 61.

The conveyor means 15 also includes a drive means 67 for driving the first and second portions 47, 49 thereof. The drive means 67 preferably consists of an electric motor 69 and a pair of sprockets 71, 73 adapted to operably engage the first and second side members 51, 53 of the first portion 47 of the conveyor means 15 in a manner well known to those skilled in the art to cause the first portion 47 of the conveyor means 15 to be driven by the electric motor 69. The second portion 49 of the conveyor means 15 can be likewise driven by an electric motor and a pair of sprockets or the like (not shown), or can be driven by the movement of the first portion 47 of the conveyor means 15 in any manner apparent to those skilled in the art. For example, the second portion 49 of the conveyor means 15 can be made to frictionally engage the first portion 47 thereof so that it will move with the first portion 47.

It should be noted that the knifelike means 21 and the drive means 23 of the slicer means 13 may be driven by the movement of the first and second portions 47, 49 of the conveyor means 15 in any manner well known to those skilled in the art thereby doing away with the need for the electric motors 37, 45. In any event, the knifelike means 21 and drive means 23 of the slicer means 13 are synchronized with the movement of the first and second portion 47, 49 of the conveyor means 15 in any manner well known to those skilled in the art.

The reservoir means 17 of the apparatus 11 consists of a liquid-tight housing member 75 constructed of any suitable material such as sheet metal or the like in any manner apparent to those skilled in the art. The housing member 75 preferably encloses the slicer means 13 and the conveyor means 15. The housing member 75 preferably includes structure for allowing the slicer means 13 and the conveyor means 15 to be mounted thereto.

An access port 77 (see FIGS. 1 and 3) may be provided in the housing member 75 for allowing the raw potato RP to be inserted into the slicer means 13. The access port 77 may be provided with a door or the like (not shown).

The heater means 18 may consist of any well-known gas or electric heater well known to those skilled in the art which will sufficiently heat the cooking oil O.

The means for causing the thin potato slices PS to be suffused with the heated cooking oil O may include guide means for causing the conveyor means 15 to convey the thin potato slices PS directly through the quantity of heated cooking oil O contained within the reservoir means 17 (see FIG. 1). The guide means may consist of flange-like slide members 79 located at at least all of the strategic locations along the sinuous path of the conveyor means 15 (see, in general, FIGS. 1 and 2). That is, the flange-like slide members 79 are located in a manner so as to cause the first and second portions 47, 49 of the conveyor means 15 to follow a sinuous path in a manner which should be apparent to those skilled in the art.

On the other hand, the means for causing the thin potato slices PS to be suffused with the heated cooking oil O may include vaporescence means communicated with the quantity of heated cooking oil O contained within the reservoir means 17 for forming a mist of heated cooking oil O about the thin potato slices PS being conveyed by the conveyor means 15 (see FIG. 13). This embodiment includes the flange-like slide members 79 for causing the first and second portions 47, 49 of the conveyor means 15 to follow a sinuous path but the level of cooking oil O in the reservoir means 17 is below the lowest level of the sinuous path followed by the conveyor means 15. A pump 81 is utilized to force the heated cooking oil through a plurality of pipelike members 83 and out a plurality of nozzles 85 in a manner which should be apparent to those skilled in the art to spray the thin potato slices PS being carried by the conveyor means 15 with the heated cooking oil O.

The apparatus 11 may include a first dryer means for substantially drying the thin potato slices PS prior to the thin potato slices PS being suffused with the heated cooking oil. The first dryer means may consist simply of a tunnellike portion created by wall members 87 in the housing member 75 to prevent the heated cooking oil O from suffusing the thin potato slices PS until a sufficient period of time has passed which allows the heat from the heated cooking oil O to substantially dry the thin potato slices. The first dryer means may include an auxiliary electric heater 89 or the like provided for blowing heat on the thin potato slices PS prior to the thin potato slices PS being suffused with the heated cooking oil O. By so substantially drying the thin potato slices PS prior to the thin potato slices being suffused with the heated cooking oil O, any popping or splattering of the heated cooking oil O caused by moisture within the thin potato slices PS will be minimized.

The apparatus 11 may includes a second dryer means for substantially drying the thin potato slices PS after the thin potato slices PS have been suffused with the heated cooking oil O. The second dryer means may consist simply of an electric heater 91 or the like located within the housing member 75 at a location for blowing heated air on the thin potato slices PS after the thin potato slices have been suffused with the heated cooking oil O.

The apparatus 11 preferably includes a removable tray-like member 93 (see FIGS. 1 and 3) for containing the thin potato slices PS after they have been suffused with the heated cooking oil O. More specifically the conveyor means 15 is adapted to dump the thin potato slices PS from the first portion 47 thereof after the thin potato slices PS have been cooked by being suffused with the heated cooking oil O. This dumping operation may be accomplished in any manner apparent to those skilled in the art. For example, the flange-like slide members 79 may be positioned so as to cause the plurality of pocket-like member 55 of the first portion 47 of the conveyor means 15 to be downwardly directed after the thin potato slices PS have been suffused with the heated cooking oil O and additional flange-like slide members 95 may be provided (see FIG. 1) to move the second portion 49 of the conveyor means 15 away from the first portion 47 thereof so that the thin potato slices PS will fall from the pocket-like members 55 of the first portion 47 of the conveyor means 15 by the force of gravity. The removable tray-like member 93 is preferably located in the housing member 75 in a position to catch the thin potato slices PS as they are dumped from the conveyor means 15. An access port 97 is provided in the housing member 75 to allow the tray-like member 93 to be selectively removed therefrom (see FIGS. 3 and 13).

Figure 14:
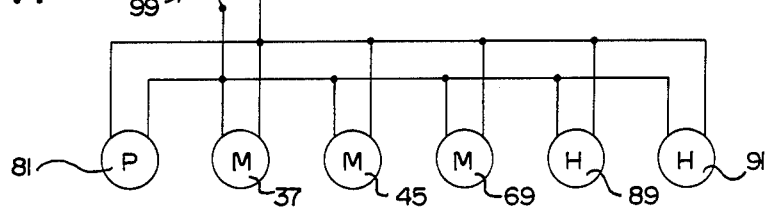
FIG. 14 is a schematic which diagrammatically depicts the operating structure of the present invention as shown in FIG. 13.

The apparatus 11 may include a thermostat 99 for automatically activating the slicer means 13 and the conveyor means 15 once the quantity of cooking oil O contained within the reservoir means 17 reaches a certain temperature. This may be accomplished in a manner as suggested by the schematic diagrams of FIGS. 7 and 14. More specifically, the apparatus 11 may include a main switch 101 which, when closed, causes the heater means 18 to heat the cooking oil O in the reservoir means 17. Once the cooking oil O in the reservoir means 17 has been heated to a predetermined degree, the thermostat 99 will close causing the electric motors 37, 45, 69 to be activated to, in turn, activate the slicer means 13 and the conveyor means 15. Also, the closing of the thermostat 99 may activate the pump 81 and the heaters 89, 91. It should be noted that the thermostat 99 may include a light member (not shown) for indicating when the cooking oil O within the reservoir means 17 has reached a certain temperature.

The housing member 75 may be provided with a door member 103 (see FIG. 1) for allowing access into the interior thereof. Additionally, various drain ports, such as vapor drain 105 and oil drain 107, and fill ports, such as fill port 109, may be provided in the housing member 75 as will be apparent to those skilled in the art. Also, the reservoir means 17 may be provided with various filter means for filtering the cooking oil.

Although the invention has been described and illustrated with respect to a preferred embodiment thereof, it is not to be so limited since changes and modifications may be made therein which are within the full intended scope of the invention.

I claim:

1. An apparatus for processing potato chips, said apparatus comprising: slicer means for cutting thin potato slices from a raw potato, conveyor means for receiving said thin potato slices as they are cut by said slicer means for conveying said thin potato slices along a vertically formed sinuous path, said conveyor means including a first portion for receiving said thin potato slices and a second portion for covering said first portion after said thin potato slices have been received thereon to loosely trap said thin potato slices therebetween, said first portion including a plurality of pocket-like members for loosely receiving said thin potato slices, reservoir means for containing a quantity of cooking oil, heater means for heating said quantity of cooking oil, means for force spraying said thin potato slices being conveyed by said conveyor means with said heated cooking oil whereby said thin potato slices are cooked, a first dryer means for substantially drying said thin potato slices prior to said thin potato slices being force sprayed with said heated cooking oil, and a second dryer means for substantially drying said thin potato slices after said thin potato slices have been force sprayed with said heated cooking oil.

2. The apparatus of claim 1 in which said slicer means includes holding means for holding said raw potato, knifelike means for cutting said thin potato slices from one end of said raw potato as said raw potato is held by said holding means, and drive means for causing said one end of said raw potato to advance relative to said holding means as said knife-like means cuts said thin potato slices therefrom.

3. The apparatus of claim 2 in which said knifelike means and said drive means of said slicer means and said conveyor means are synchronized one with the other.

4. The apparatus of claim 2 in which said holding means of said slicer means is angled downwardly.

5. The apparatus of claim 1 in which is included thermostat means for automatically activating said slicer means and said conveyor means once said quantity of cooking oil contained within said reservoir means reaches a certain temperature.

6. The apparatus of claim 1 in which said first and second portions of said conveyor means are substantially open for allowing said thin potato slices to be force sprayed with said heated cooking oil while trapped therebetween.

7. The apparatus of claim 6 in which said conveyor means is adapted to dump said thin potato slices from said first portion thereof after said thin potato slices have been cooked, and in which is included a removable tray-like member for catching said thin potato slices as they are dumped from said conveyor means.

8. The apparatus of claim 1 in which said means for causing said thin potato slices to be forces sprayed with said heated cooking oil includes vaporecence means communicated with said quantity of heated cooking oil contained within said reservoir means for forming a mist of said heated cooking oil about said thin potato slices being conveyed by said conveyor means.

9. The apparatus of claim 1 in which said means for causing said thin potato slices to be forces sprayed with said heated cooking oil includes guide means for causing said conveyor means to convey said thin potato slices through said heated cooking oil contained within said reservoir means.

* * * * *